United States Patent [19]

Umehara et al.

[11] Patent Number: 4,602,232
[45] Date of Patent: Jul. 22, 1986

[54] ELECTROMAGNETIC DRIVE UNIT

[75] Inventors: Teruo Umehara; Norio Matsumoto, both of Saitama, Japan

[73] Assignee: Hitachi Metals, Ltd., Tokyo, Japan

[21] Appl. No.: 732,695

[22] Filed: May 10, 1985

[30] Foreign Application Priority Data

May 16, 1984 [JP] Japan .................. 59-97862

[51] Int. Cl.⁴ .............................................. H01F 7/08
[52] U.S. Cl. ..................................... 335/222; 335/223
[58] Field of Search ...................... 335/222, 223, 226; 324/151 R, 151 A

[56] References Cited

U.S. PATENT DOCUMENTS

| | | | |
|---|---|---|---|
| 2,980,857 | 4/1961 | Langford | 335/222 X |
| 3,181,065 | 4/1965 | Bajars | 335/222 X |
| 3,395,349 | 7/1968 | Bajars | 335/222 X |

FOREIGN PATENT DOCUMENTS 842585  4/1972  U.S.S.R. .................. 324/151 A

Primary Examiner—George Harris
Attorney, Agent, or Firm—Antonelli, Terry & Wands

[57] ABSTRACT

In an electromagnetic drive unit including;
a nearly E-shaped yoke having first and second concentric circular arc shaped side yokes respectively inside and outside an arc-shaped center yoke,
a first arc-shaped permanent magnet fixed to said first side yoke so as to form a first magnetic gap inside said center yoke,
a second arc-shaped permanent magnet fixed to said second side yoke so as to form a second magnetic gap outside said center yoke, and
a movable coil member disposed in said magnetic gaps, said first and second permanent magnets are so provided with anisotropy in directions which are different each other that the magnetic flux density in said first magnetic gap will be nearly equal to that in said second magnetic gap.

5 Claims, 4 Drawing Figures

ELECTROMAGNETIC DRIVE UNIT

APPLIED FIELD OF THE INVENTION

The present invention relates to an electromagnetic drive unit which converts electric energy into mechanical kinetic energy by electromechanical function and which is used in positioning means for a magnetic head of a magnetic disk unit.

PRIOR ART

In positioning means for a magnetic head of a magnetic disk unit, an electromagnetic drive unit of movable coil type referred to as voice-coil type linear motor is generally used. As disclosed in Japanese Patent Application Laid-Open Nos. 3561/83 and 99256/83, for example, such an electromagnetic unit has a movable coil in a magnetic gap formed around a cylindrical center yoke. And the movable coil is moved straightforward along a center pole. To meet the recent demand for a small-sized, light magnetic disk unit, the voice-coil type linear motor must be small-sized and light. In particular, it must be thin. Therefore, a voice-coil type linear motor having a rotating movable coil as disclosed in Japanese Patent Application Laid-Open Nos. 88559/80 and 101370/81 has been proposed and put into practical use.

An example of such a rotation-type electromagnetic drive unit comprises a nearly E-shaped yoke having concentric arc-shaped side yokes respectively inside and outside arc-shaped center yoke, arc-shaped permanent magnets respectively provided on side yokes, and a movable coil member surrounding the center yoke. The movable coil member is coupled to the rear end of a rotation arm having a magnetic head on the front end thereof. By letting flow a current through the movable coil member, the member rotates in a magnetic gap formed around the center yoke to position the magnetic head.

PROBLEMS OF THE PRIOR ART

In the above described electromagnetic drive unit of the prior art, two permanent magnets are so oriented as to have their axes of easy magnetization in the same direction. There are two methods generally used to orient the axis of easy magnetization of such a permanent magnet. In one of the methods, the magnet is provided with anisotropy in parallel magnetic fields. In the other method, the magnet is provided with anisotropy in radial magnetic fields.

When a permanent magnet produced by the former method is used, however, the magnetic flux density is lowered in the exterior magnetic gap although it is high in the interior magnetic gap. On the contrary, a permanent magnet produced by the latter method yields a low magnetic flux density in the interior magnetic gap although it yields a high magnetic flux density. Thus, the difference between the magnetic flux densities in two magnetic gaps degrades the performance, resulting in a problem.

OBJECT OF THE INVENTION

An object of the present invention is to provide an electromagnetic drive unit having decreased difference between magnetic flux densities of magnetic gaps formed at both sides of the center yoke.

Another object of the present invention is to provide a highly efficient, small-sized electromagnetic drive unit.

SUMMARY OF THE INVENTION

Therefore, an electromagnetic drive unit in accordance with the present invention includes a nearly E-shaped yoke having first and second concentric circular arc shaped side yokes respectively inside and outside an arc-shaped center yoke, a first arc-shaped permanent magnet fixed to the first side yoke so as to form a first magnetic gap inside said center yoke, a second arc-shaped permanent magnet fixed to the second side yoke so as to form a second magnetic gap outside the center yoke, and a movable coil member disposed in the magnetic gaps. And the first and second permanent magnets are so provided with anisotropy in directions which are different from each other so that the magnetic flux density in the first magnetic gap will be nearly equal to that in the second magnetic gap.

DESCRIPTION OF THE PREFERRED EMBODIMENT

Figure 1:
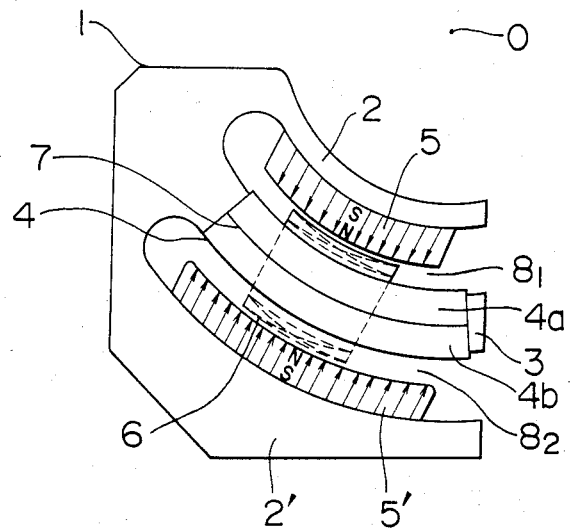
FIG. 1 shows a front view of an example of an electromagnetic drive unit of the prior art.

In FIG. 1, a yoke 1 nearly taking the shape of letter E is composed of side yokes 2 and 2' as well as a center yoke 3. The interior and exterior periphery faces of the side yoke 2 and the center yoke 3 as well as the interior periphery face of the side yoke 2' are provided to form concentric circular arc faces with a point 0 as the center. A short ring 4 comprising an electric conductor is attached to the center yoke for the purpose of speeding up the rise and inversion in the current of the movable coil. The short ring 4 is composed of ring pieces 4a and 4b with a joint 7 between them. Permanent magnets 5 and 5' are attached to the side yokes 2 and 2', respectively. The permanent magnets 5 and 5' are magnetized so that faces opposing each other will have the same polarity as illustrated in FIG. 1. A movable coil member 6 represented by broken lines if coupled to the rear end of an arm (not illustrated) rotates around the fulcrum 0. A magnetic head (not illustrated) is mounted on the front end of the arm.

When a current is let flow through the electromagnetic coil in such a structure, a thrust is generated in accordance with the Fleming's left-hand rule. Thus, the movable coil member 6 is rotated in the magnetic gap formed by the center yoke 3 and the permanent magnets 5 and 5' while taking the point 0 as the fulcrum. As a result, the magnetic head is positioned. The rotation direction can be changed over by inverting the direction of the current flowing through the coil.

In the above described electromagnetic drive unit of the prior art, ferrite magnets or rare-earth magnets are generally used as the permanent magnets 5 and 5'. In general, both permanent magnets 5 and 5' are produced under the same orientation condition. When platelike permanent magnets which have been subjected to orientation in parallel magnetic fields along the thickness direction is processed into the arc shape to form the permanent magnets 5 and 5', the magnets 5 and 5' have anisotropy in the direction as represented by arrows. Although an interior magnetic gap $8_1$ has a high magnetic flux density, therefore, an exterior magnetic gap $8_2$ has a lowered magnetic flux density. In addition, when the input current to the coil is constant, the drive torque is in proportion to the magnetic flux density of the magnetic gap. The low magnetic flux density in one of the two magnetic gaps thus results in poor performance or a lowered drive torque.

Figure 2:
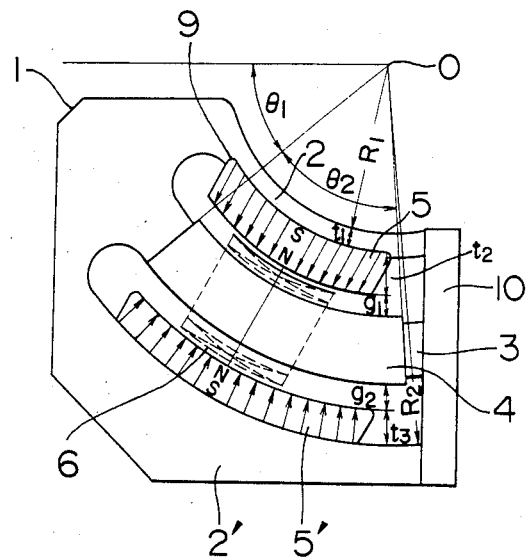
FIG. 2 shows a front view of an embodiment of an electromagnetic drive unit according to the present invention.

An electromagnetic drive unit according to the present invention as illustrated in FIG. 2 is similar to the electromagnetic unit of the prior art as illustrated in FIG. 1 in shapes and dimensions of the yoke and parmanent magnets, magnetic circuit, and operation principle. In contrast with the prior art, however, the permanent magnet 5 has been subjected to a magnetic field orientation process which is different from that for the permanent magnet 5'. To obtain the permanent magnet 5, a platelike permanent magnet which has been subjected to orientation in parallel magnetic fields along the thickness direction is processed into the arc shape in the same way as FIG. 1. Accordingly, the magnetic gap $8_1$ has a sufficiently high magnetic flux density in the same way as the prior art. On the other hand, the permanent magnet 5' has been subjected to orientation in radial magnetic fields. That is to say, the permanent magnet 5' has anisotropy toward the point 0. As a result, concentration of the magnetic flux yields a high magnetic flux density in the magnetic gap $8_2$.

In this way, the magnetic gaps inside and outside the center yoke have similar high magnetic flux densities, resulting in the high performance of the unit.

As the above described permanent magnets according to the present invention, various magnets such as the ferrite magnet, Alnico magnet, rare-earth cobalt magnet, or the rare-earth-iron-boron sintered magnet now under development as disclosed in Japanese Patent Application Laid-Open Nos. 46008/84 and 64733/84 may be used.

In such an electromagnetic unit, however, a strong demagnetization field is applied to the permanent magnet in use. Accordingly, it is desirable to use a permanent magnet having strong retentivity such as a rare-earth magnet. The strength of the retentivity is in proportion to the coil input and is in inverse proportion to the thickness of the permanent magnet. When a thin permanent magnet which is nearly 4 to 6 mm in thickness is used, therefore, it is desirable to use a rare-earth cobalt of $RC_{05}$ system which is highly resistant to demagnetization (i.e., IHc is larger than 10 KOe) as disclosed in Japanese Patent Publication Nos. 364/83, 14731/81, and 14736/81. Since the Nd-Fe-B magnet has excellent characteristics including Br exceeding 11 KG, IHc exceeding 17 KOe, and (BH)max exceeding 29 MGOe, this magnet can also be advantageously used for the present invention.

The method for producing the permanent magnet used in accordance with the present invention will now be described by referring to a rare-earth cobalt magnet of $RC_{05}$ system as an example.

The following is an example of production steps for a rare-earth cobalt magnet of $RC_{05}$ system. Cobalt and a rare-earth metal such as Sm are mixed together with a predetermined ratio. The mixture is subjected to vacuum fusion. Thereafter, ingots having composition of $Sm_mC_{05}$ are cast. The resultant ingots are reduced to powder which is several $\mu$m, usually 3 to 4 $\mu$m. The reduced powder is compressed and shaped in the magnetic field of 8 to 10 KOe with the pressure of 7 to 10 ton/cm². The powder is then sintered at the temperature of 1000° to 1200° C. to be subjected to heat treatment, i.e., aging treatment.

Figure 3:
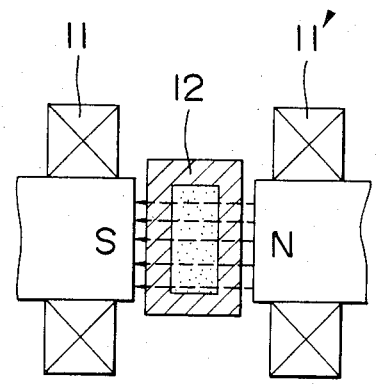
FIGS. 3 and 4 show schematic cross-sectional views of a shaping die for permanent magnets used according to the present invention.
Figure 4:
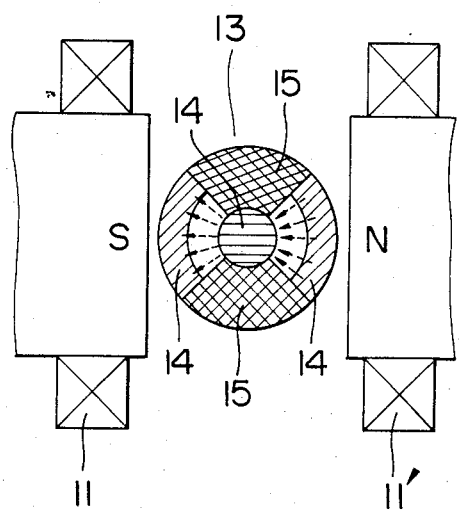

The permanent magnet 5 as illustrated in FIG. 2 can be produced, for example, by providing a pair of electromagnets 11 and 11' on the periphery of a shaping die 12 as illustrated in FIG. 3, compressing and shaping the resultant shaping die 12 in the parallel magnetic fields, sintering the shaped product, applying heat treatment thereto, and processing it into a circular arc shape. On the other hand, the permanent magnet 5' as illustrated in FIG. 2 can be produced, for example, by providing a pair of electromagnets 11 and 11' on the periphery of a shaping die 13 comprising ferromagnetic bodies 14 and nonmagnetic bodies 15 as illustrated in FIG. 4, compressing and shaping the resultant shaping die in radial magnetic fields, sintering the shaped product, and applying heat treatment thereto.

In contrast to FIG. 1, the short ring 4 of the electromagnetic drive unit illustrated in FIG. 2 is made of a pipelike member shaped in one body. As illustrated in FIG. 3, the short ring 4 can be obtained, for example, by curving a square-shaped drawn pipe made of Cu into the arc shape and plating it.

By using the above described short ring 4, the joint is eliminated. Since the impedance is then not increased, the predetermined performance can be ensured. In addition, the short ring can be fixed only by inserting it into the center yoke and fixing it with a binding agent. It is thus possible to avoid deterioration in the binding agent and plating. In addition, the number of the manufacturing processes can be significantly reduced.

Further, in the above described yoke, a projection 9 is formed on the side yoke 2. Thereby the permanent magnet 5 can be easily positioned. Further, in the above described yoke, an auxiliary yoke 10 is provided on open end faces of the side yokes 2 and 2' as well as the center yoke 3. That is to say, a magnetic circuit is formed at an open end. Accordingly, the leakage flux can be reduced by approximately 15% as compared with FIG. 1. Thus a sufficient amount of effective magnetic flux can be assured in the magnetic gap. Since the thrust of the movable coil is in proportion to the input to the movable coil and the amount of the magnetic flux in the magnetic gap as well known, a high thrust can be obtained by using the auxiliary yoke provided that the input to the coil is constant.

In general, the yoke is composed of a soft magnetic material, and, in particular, of low-carbon steel such as stainless steel material. From the viewpoint of performance, it is desirable to make the yoke of a high density material such as a sintered body (density $\approx$ 7.3 g/cm³) comprising pure iron. For the auxiliary yoke, it is desirable to make it of a high magnetic flux density such as permendur of 49% Co–2% V for the purpose of preventing the above described leakage flux.

A concrete example of the present invention and an example of camparison will now be described.

Three electromagnetic drive units Nos. 1, 2 and 3 were prepared. The electromagnetic drive unit No. 1 includes the permanent magnet 5 which was subjected to the orientation process in the parallel magnetic fields and the permanent magnet 5' which was subjected to the orientation process in the radial magnetic fields. The electromagnetic drive unit No. 2 includes the permanent magnets 5 and 5' which were both subjected to the orientation process in the parallel magnetic fields. And the electromagnetic drive unit No. 3 includes the permanent magnets 5 and 5' which were both subjected to orientation process in the radial magnetic fields. Table 1 shows measurements (average value) of magnetic flux densities in the interior and exterior magnetic gaps.

In any one of the electromagnetic units Nos. 1, 2 and 3, rare-earth cobalt magnets of $RC_{O5}$ system (H-18B produced by Hitachi Metals Ltd.) are employed as permanent magnets and sintered material comprising pure iron is used as the yoke. And principal dimensions are chosen as $R_1=19.5$ mm, $t_1=3.8$ mm, $t_2=4.7$ mm, $g_1=2.3$ mm, $R_2=44.5$ mm, $t_3=4.7$ mm, $g_2=2.3$ mm, $\theta_1=39°$, and $\theta_2=55°$.

TABLE 1

| Unit No. | Magnetic flux density in magnetic gap (G) | |
|---|---|---|
| | Interior gap ($\delta_1$) | Exterior gap ($\delta_2$) |
| 1 | 4295 | 4305 |
| 2 | 4295 | 4160 |
| 3 | 3665 | 4305 |

As evident from FIG. 1, the magnetic flux densities in both magnetic gaps are nearly equal each other and are large in the unit (No. 1) according to the present invention. In the unit No. 1, the drive torque is also increased by approximately 10% as compared with the unit No. 2.

We claim:
1. In an electromagnetic drive unit comprising:
a substantially E-shaped yoke having an arc-shaped center yoke, a first circular arc shaped side yoke disposed on the inside of said center yoke, and a second circular arc shaped side yoke disposed on the outside of said center yoke, said center, said first, and said second yokes having a common axis;
a first arc-shaped permanent magnet fixed to said first side yoke so as to form a first magnetic gap inside said center yoke;
a second arc-shaped permanent magnet fixed to said second side yoke so as to form a second magnetic gap outside said center yoke; and
a movable coil member disposed in said magnetic gaps, wherein said first and second permanent magnets are magnets provided with anisotropy in directions which are different with each other, so that the magnetic flux density in said first magnetic gap is substantially equal to that in said second magnetic gap.

2. An electromagnetic drive unit according to claim 1, wherein said first permanent magnet is a magnet provided with anisotropy in parallel magnetic fields and said second permanent is a magnet provided anisotropy in radial magnetic fields.

3. An electromagnetic drive unit according to claim 2, wherein said first and second permanent magnets are rare-earth magnets.

4. An electromagnetic drive unit according to claim 3, wherein said first and second permanent magnets are magnets of $RC_{O5}$ system.

5. An electromagnetic drive unit according to claim 3, wherein said first and second permanent magnets are magnets of Nd-Fe-B system.

* * * * *